United States Patent
Cole

(10) Patent No.: US 7,830,920 B2
(45) Date of Patent: Nov. 9, 2010

(54) SYSTEM AND METHOD FOR ENHANCING AUDIO QUALITY FOR IP BASED SYSTEMS USING AN AMR PAYLOAD FORMAT

(75) Inventor: Gary R. Cole, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1150 days.

(21) Appl. No.: 10/905,198

(22) Filed: Dec. 21, 2004

(65) Prior Publication Data

US 2006/0133276 A1 Jun. 22, 2006

(51) Int. Cl.
*H04J 3/18* (2006.01)
(52) U.S. Cl. .................. 370/477; 370/230; 370/412
(58) Field of Classification Search .......... 370/230, 370/412, 477
See application file for complete search history.

(56) References Cited

U.S. PATENT DOCUMENTS

| | | | |
|---|---|---|---|
| 6,876,666 B1 | 4/2005 | Engdahl | |
| 2004/0076191 A1* | 4/2004 | Sundqvist et al. | 370/516 |
| 2005/0227657 A1* | 10/2005 | Frankkila et al. | 455/255 |
| 2006/0088065 A1* | 4/2006 | Khatter | 370/528 |
| 2006/0253622 A1* | 11/2006 | Wiemann et al. | 710/52 |

FOREIGN PATENT DOCUMENTS

| | | |
|---|---|---|
| JP | 09027808 A | 1/1997 |
| JP | 2002318599 A | 10/2002 |
| JP | 2003152752 A | 5/2003 |
| JP | 2004015761 A | 1/2004 |

OTHER PUBLICATIONS

Zizhi Qiao et al., "A new method for VoIP quality of service control use combined adaptive sender rate and priority making" Communications, 2004 IEEE International Conference on Paris, France Jun. 20-24, 2004, Piscataway, NJ, USA, IEEE, vol. 3, Jun. 20, 2004, pp. 1473-1477, XP010709600 ISBN: 0-7803-8533-0.

(Continued)

*Primary Examiner*—Jason E Mattis
(74) *Attorney, Agent, or Firm*—R. Brian Drozd; Moore & Van Allen PLLC

(57) ABSTRACT

A method of enhancing audio quality for Internet protocol (IP) based systems using an adaptive multi-rate (AMR) payload format is presented. If a network buffer indicative of network congestion exceeds its threshold a determination is made whether to place a NO DATA frame into the current RTP packet instead of the AMR frame. If network conditions are too congested then a NO DATA frame is placed into the current RTP packet. The process is repeated for each incoming AMR frame. The process first ensures that the AMR coding rate is set to its lowest possible coding rate prior to substituting a AMR frame with a NO DATA frame. The substitution pattern is spread over the entire RTP packet to avoid clusters of NO DATA frames. The process can also single out AMR frames of lower energy value that would be good candidates for substitution.

10 Claims, 5 Drawing Sheets

OTHER PUBLICATIONS

International Preliminary Report on Patentability, corresponding International Patent Application PCT/US2005/021896, Jul. 5, 2005.

Zizhi Qiao et al., "A New Method for VoIP Quality of Service Control Use Combined Adaptive Sender Rate and Priority Marking", Communications, 2004 IEEE International Conference on Paris, France Jun. 20-24, 2004, Piscataway, NJ.

Sony Ericsson Mobile Communications AB, "International Application No. PCT/US05/021896" International Search Report, Oct. 19, 2005.

Sony Ericsson Mobile Communications AB, "International Application No. PCT/US05/021896" Written Opinion, Oct. 19, 2005.

Japanese Patent Office; Office Action; Jun. 3, 2010; issued in Japanese Patent Application No. 2007-546629.

State Intellectual Property Office, P.R. China; Second Office Action; Jul. 19, 2010; issued in Chinese Patent Application No. 200580040685.1.

* cited by examiner

FIGURE 4

| RTP Header | Frame 1 | Frame 2 | Frame 3 | Frame 4 | Frame 5 | Frame 6 | Frame 7 | Frame 8 | Frame 9 | Frame 10 |
| --- | --- | --- | --- | --- | --- | --- | --- | --- | --- | --- |
| RTP Header | Frame 11 | Frame 12 | Frame 13 | Frame 14 | Frame 15 | Frame 16 | Frame 17 | Frame 18 | Frame 19 | Frame 20 |
| RTP Header | Frame 21 | Frame 22 | Frame 23 | Frame 24 | Frame 25 | Frame 26 | Frame 27 | Frame 28 | Frame 29 | Frame 30 |

FIGURE 5

| RTP Header | Frame 1 | Frame 2 | Frame 3 | Frame 4 | Frame 5 | Frame 6 | Frame 7 | Frame 8 | Frame 9 | Frame 10 |
| --- | --- | --- | --- | --- | --- | --- | --- | --- | --- | --- |
| RTP Header | Frame 11 | Frame 12 | Frame 13 | Frame 14 | Frame 15 | Frame 16 | Frame 17 | Frame 18 | Frame 19 | Frame 20 |
| RTP Header | Frame 21 | Frame 22 | Frame 23 | Frame 24 | Frame 25 | Frame 26 | Frame 27 | Frame 28 | Frame 29 | Frame 30 |

SYSTEM AND METHOD FOR ENHANCING AUDIO QUALITY FOR IP BASED SYSTEMS USING AN AMR PAYLOAD FORMAT

BACKGROUND

Voice-over-IP (VoIP) has been steadily gaining in popularity within the personal computing and carrier communities. As technology advances, running similar services in cellular devices becomes viable. A key technical question is how to adapt the services to cope with reduced bandwidth and significantly less processing power compared to a desktop PC.

Push-to-talk-over-cellular (PoC) defines a half-duplex VoIP system for mobile devices. By using the packet-switched capabilities of wireless data networks the service is not restricted geographically—unlike conventional two-way radio systems such as private mobile radio (PMR).

To make PoC a success, handset and network performance should be optimal. Any performance impacting delays could mean the difference between the success and failure of the service.

The audio quality of PoC is limited by the available GPRS/EGPRS bandwidth on the cellular system. Audio data is transmitted across a PoC system using Adaptive Multi-Rate (AMR) coding packaged in the Real-Time Transport Protocol (RTP) on top of the User Datagram Protocol (UDP) unacknowledged transport protocol. As a result lost packets are never retransmitted.

PTT is a real time application where buffering of audio data is kept to a minimum to reduce latency from the beginning of a talk burst to the beginning of playback. Each RTP packet is time stamped to allow the system to discard delayed packets, which in turn prevents the talk burst from growing unbounded.

Currently, techniques have been derived to improve downlink streaming of AMR RTP packets by buffering to reduce jitter and packet re-ordering to correct packets received out of order. However, it has been shown that limited bandwidth in the uplink (send side) causes lost packets which can not be corrected in the downlink. This bandwidth limitation can be caused by congestion, or by systems with minimal data resources. Currently, the only mechanism to reduce bandwidth in the uplink is to change AMR coding rates. This approach alone does not provide enough reduction in bandwidth to prevent lost packets due to minimum bandwidth on the GPRS link. Problems due to limited bandwidth have been observed while using the lowest 4.75 kb AMR coding rate.

What is needed is a system and/or method to further conserve uplink bandwidth in a PoC or other conversational service IP based application using an AMR payload format.

SUMMARY

A system, method, and computer program product for enhancing audio quality for Internet protocol (IP) based systems using an adaptive multi-rate (AMR) payload format is presented. The method provides an added level of intelligence to the standard RTP AMR frame packing procedures. If a network buffer indicative of network congestion exceeds its threshold a determination is made whether to place a NO DATA frame into the current RTP packet instead of the AMR frame. If network conditions are too congested then a NO DATA frame is placed into the current RTP packet. The process is repeated for each incoming AMR frame. The process first ensures that the AMR coding rate is set to its lowest possible coding rate prior to substituting a AMR frame with a NO DATA frame. The substitution pattern is spread over the entire RTP packet to avoid clusters of NO DATA frames. The process can also single out AMR frames of lower energy value that would be good candidates for substitution.

BRIEF DESCRIPTION OF THE DRAWINGS

FIG. 4 illustrates sample RTP packets at the source without AMR frame substitution.

FIG. 5 illustrates sample RTP packets at the source with certain AMR frames substituted with NO DATA frames.

DETAILED DESCRIPTION

The techniques described herein are applicable to any conversational service IP based application using an AMR payload format or any protocol that bundles AMR frames. Moreover, the present invention can be implemented in a mobile terminal or at the application server to conserve bandwidth during periods of congestion. The present discussion utilizes Push-to-Talk over Cellular (PoC) as an exemplary embodiment to provide a basis for describing the concepts of the invention. Additionally, the present invention addresses bandwidth conservation for the transmit or send side of conversational service IP based applications as opposed to the receive side.

The present invention proposes further reducing the bandwidth in the uplink by replacing good data frames in the RTP packets with NO DATA frames. This approach offers a means to gracefully degrade the audio quality by reducing the number of lost AMR RTP packets.

The present invention uses feedback from the GPRS module in the mobile phone to reduce transmitted RTP packet sizes during GPRS congestion.

RTP packets are generated at a fixed rate from the audio subsystem in the mobile terminal during a PTT talk burst. When this rate exceeds the rate in which the packets can be transmitted across the GPRS network packets would be buffered. Unchecked, the buffer would grow unbounded ultimately resulting in lost packets. Buffering data also has the effect of delaying the transmission. Since a timestamp is placed in the RTP packet, any considerable delay may cause the packet to be discarded on the receiving side to prevent stretching of the talk burst. The present invention reduces the size of the buffered packets by replacing a percentage of good AMR frames with NO DATA frames. This technique would be employed after the system has backed the AMR coding rate down the minimum 4.75 kb rate. This technique compresses the buffered packets and preserves the integrity of the speech data by throwing out some of the data, but not the entire packet.

Figure 1:
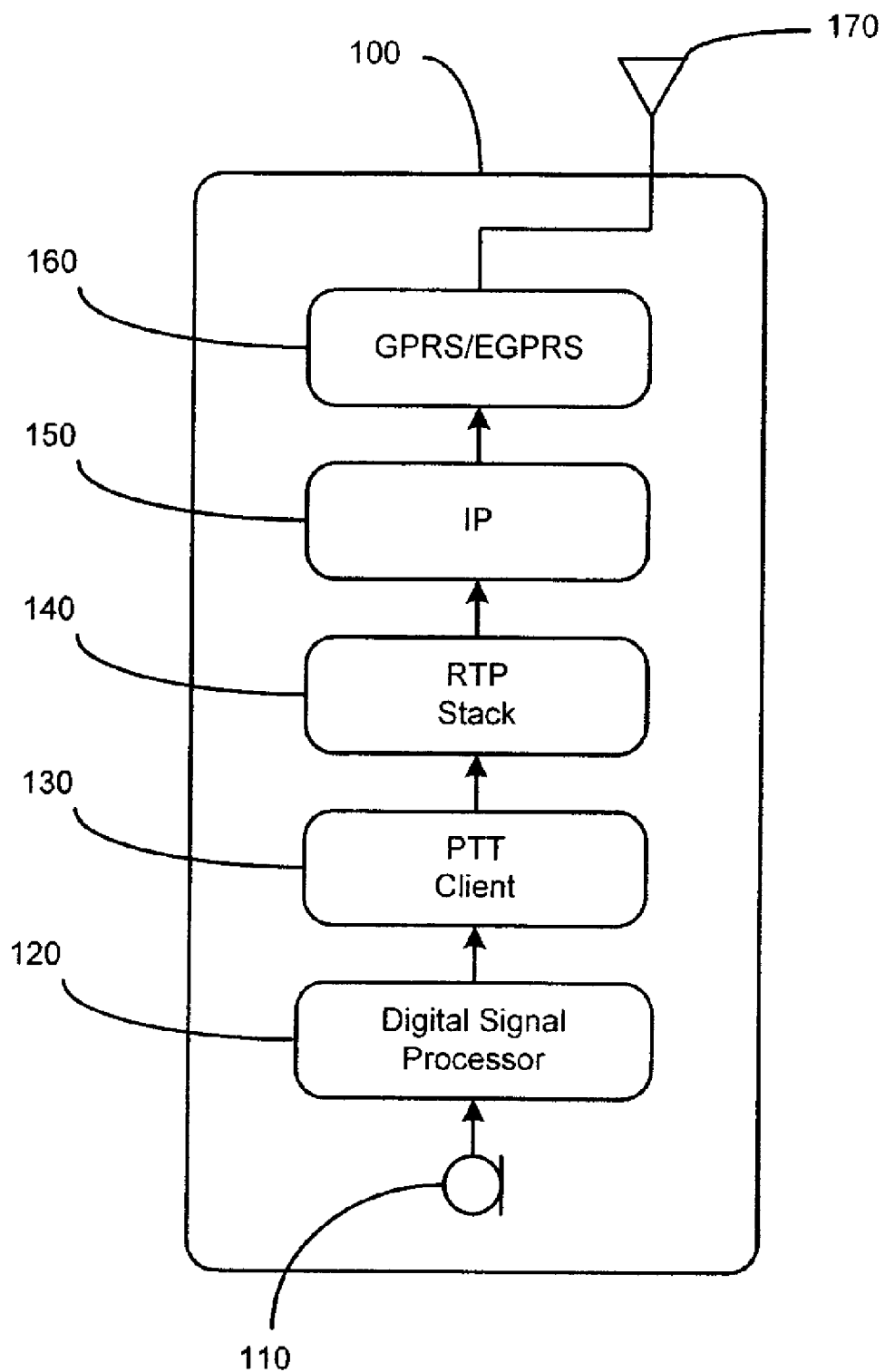
FIG. 1 is a diagram illustrating the typical uplink side data flow used in standard PoC operations.

FIG. 1 is a diagram illustrating the typical uplink side data flow used in standard PoC operations. As mentioned above, the invention can be practiced in the mobile terminal or in a PoC server. Thus reference number 100 in FIG. 1 can represent either a mobile terminal or a PoC server. The remainder of the description will adopt a nomenclature of PoC server 100 to simplify the description.

Voice data starts out as analog input to a microphone 110. A digital signal processor (DSP) 120 converts the analog voice data into digitized AMR frames at a rate of one frame per 20 milliseconds. The AMR frame is then routed to a push-to-talk (PTT) client 130. The PTT client 130 bundles anywhere from 1 to 20 AMR frames into a single RTP AMR payload packet. The RTP packet containing the AMR frame payload is then routed to the IP stack 150. At this point the GPRS/EGPRS stack fetches IP packets from the IP stack 150 as bandwidth becomes available. If bandwidth is available then the IP packet will be transmitted across the GPRS/EGPRS network 160 via antenna 170. If bandwidth is not available then the IP packet is buffered in the GPRS network module 160. If the buffer grows too large, packets will be lost.

Figure 2:
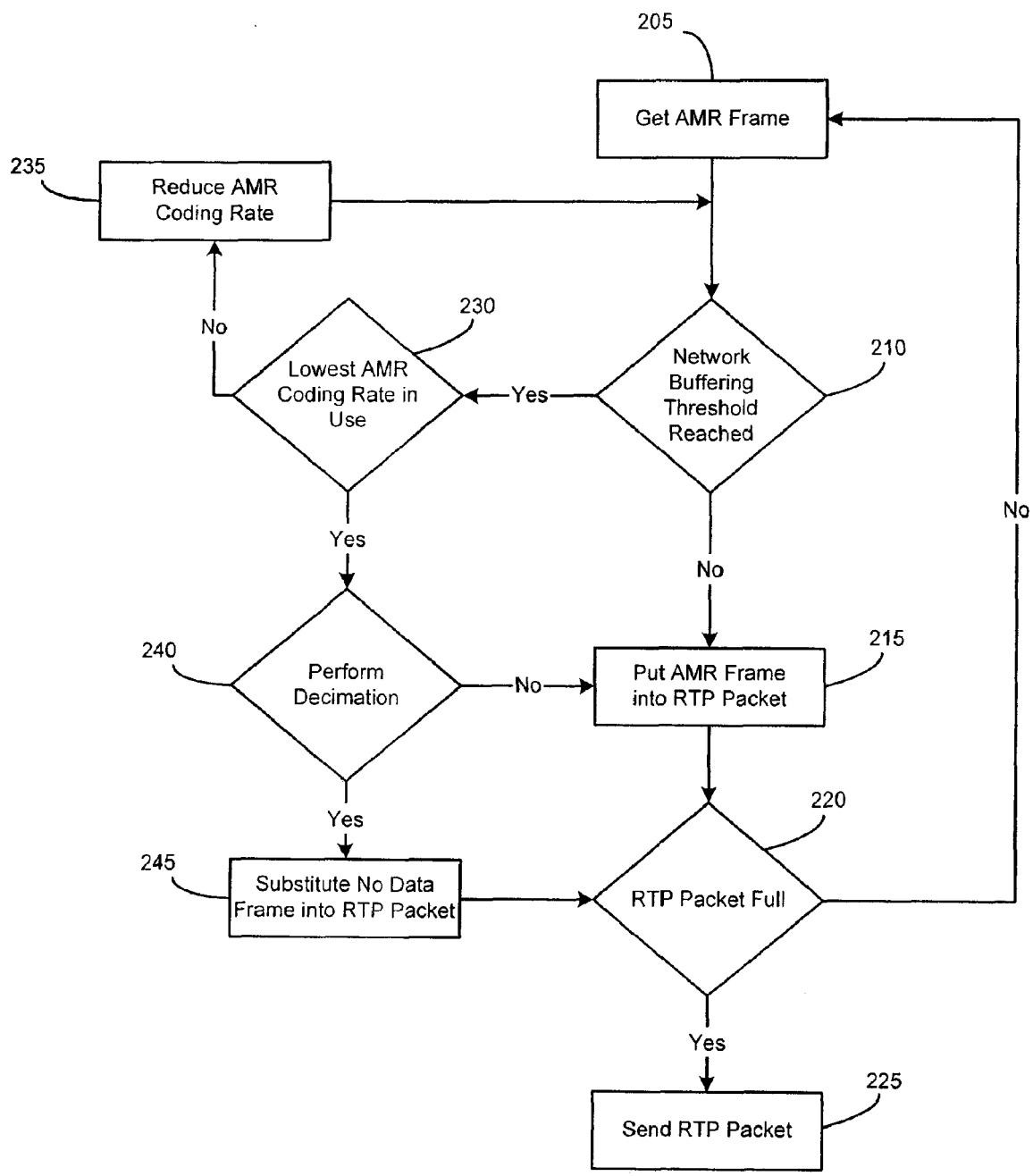
FIG. 2 is a flowchart illustrating the logical flow for implementing the concepts of the present invention.

FIG. 2 is a flowchart illustrating the logical flow for implementing the concepts of the present invention. An AMR formatted RTP packet contains from 1 to 20 AMR frames. The mobile terminal collects AMR frames 205 from the audio CODEC. Under normal conditions the AMR frames would be packed into an RTP packet based on a session negotiated parameter and sent. Under the present invention a packing algorithm would determine if any frames should be substituted with NO DATA frames. The first step is to check whether the GPRS buffering threshold has been reached 210. If the GPRS buffer still has room then the AMR frame is put into an RTP packet 215. The RTP packet is checked to see if it is full 220. If full, the RTP packet is sent 225. If not yet full control shifts back to get another AMR frame 205.

If the GPRS buffer threshold is met or exceeded then a check is made to see if the AMR codec rate is set to its lowest possible rate 230. If it is not it is reset to the lowest AMR codec rate (4.75 kbps) 235 and the buffer threshold is rechecked 210. If, however, the GPRS buffer is full and the AMR codec rate is as low as it can get then a decision is made whether to decimate the current AMR frame 240. If the algorithm decides not to decimate the AMR frame it is put into the RTP packet as is 215. If the current AMR frame is to be decimated then a NO DATA frame is substituted for the good AMR frame in the RTP packet 245 resulting in a compression of data that eases the burden on the bandwidth. The RTP packet is checked to see if it is full 220 and if so, the RTP packet is sent 225. Otherwise, another AMR frame is obtained 205 and the process repeats.

The algorithm monitors the GPRS (network) module to determine if IP packets are being transmitted across the RF link at the rate which they are being created. The GPRS module includes a buffer to store data prior to transmission. The buffer design will provide a mechanism to notify the PTT module when the buffer starts to fill. Under normal conditions the buffer should not fill but under congestive conditions the buffer will fill. The PTT module will use the notification to control how it packs AMR frames into RTP packets. The notification mechanism from the GPRS module will provide buffer status to the PTT module so that the PTT module can increase or decrease packet substitution based on network congestion. Under normal conditions no frame substitution would occur. Under worst case situations the entire packet would be filled with NO DATA frames.

Each frame substitution will provide at a minimum a 12 to 1 reduction in the frame size, since NO DATA frames contain no AMR data. The packing algorithm will endeavor to spread the replacement of good AMR frames with NO DATA frames to avoid clusters of NO DATA frames to reduce the effects to the speech.

Figure 3:
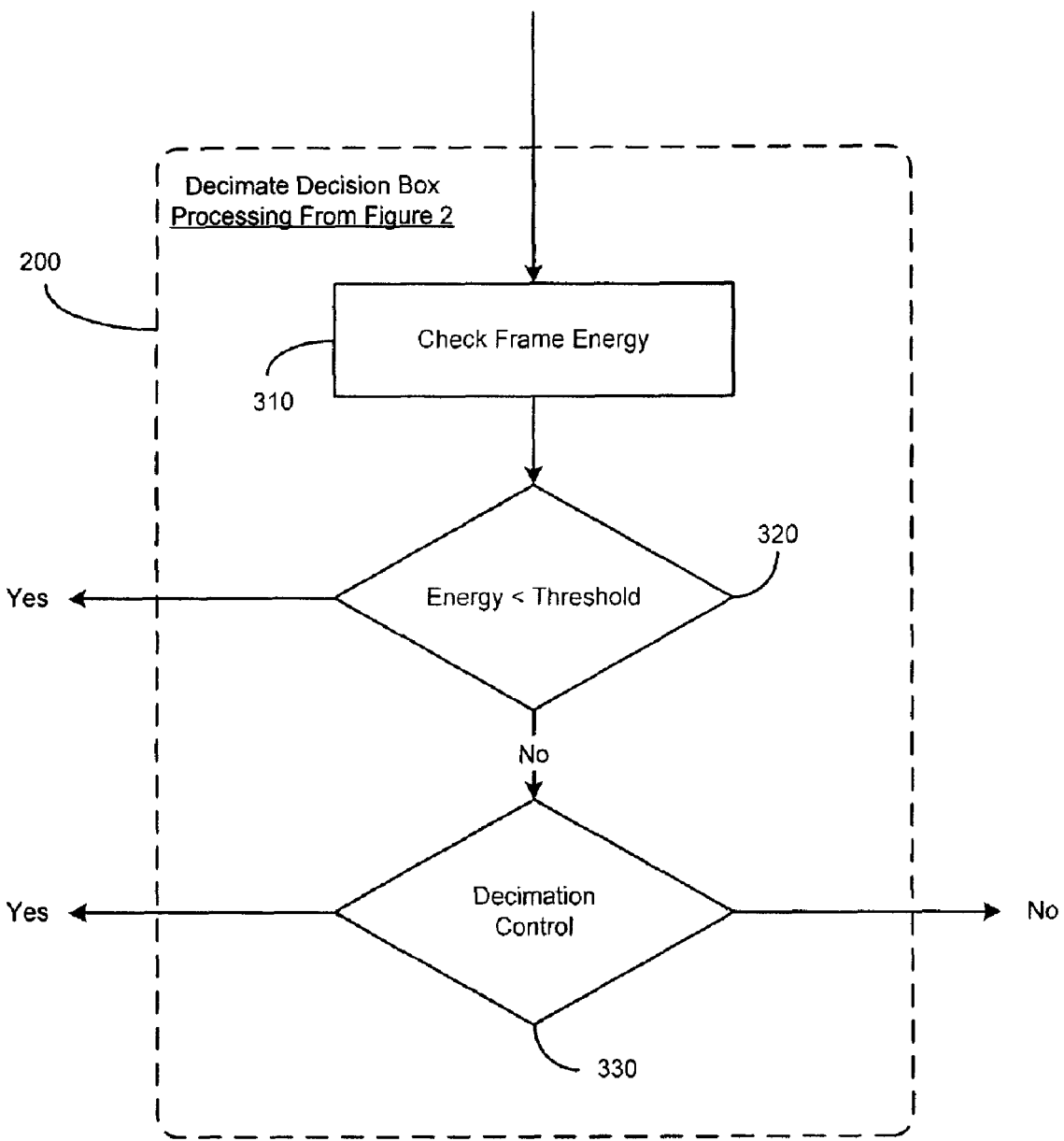
FIG. 3 is a flowchart further illustrating the decimation processing of the present invention.

FIG. 3 is a flowchart further illustrating one implementation of decimation processing of the present invention. An enhancement to the algorithm would identify frames with minimum audio energy for replacement to further reduce the effects to the speech. In the decimation determination process the AMR frames energy level would be determined 310. If it is below a threshold level 320 it is a good candidate for substitution with a NO DATA frame. If the energy level is greater than the threshold 320 a second decision to substitute the AMR frame can be made based on other factors 330. The idea is to decimate all low energy AMR frames first.

FIG. 4 illustrates sample RTP packets at the source without AMR frame substitution. This examples shows three RTP packets each containing ten (10) AMR frames and a packet header for a total of thirty (30) data frames.

FIG. 5 illustrates sample RTP packets at the source with certain AMR frames removed due to current network congestion conditions. Compared to FIG. 4, each RTP packet contains seven AMR frames instead of ten. In addition, the missing or substituted AMR frames have been spread over the distribution in an attempt to avoid clusters of missing frames.

Figure 6:
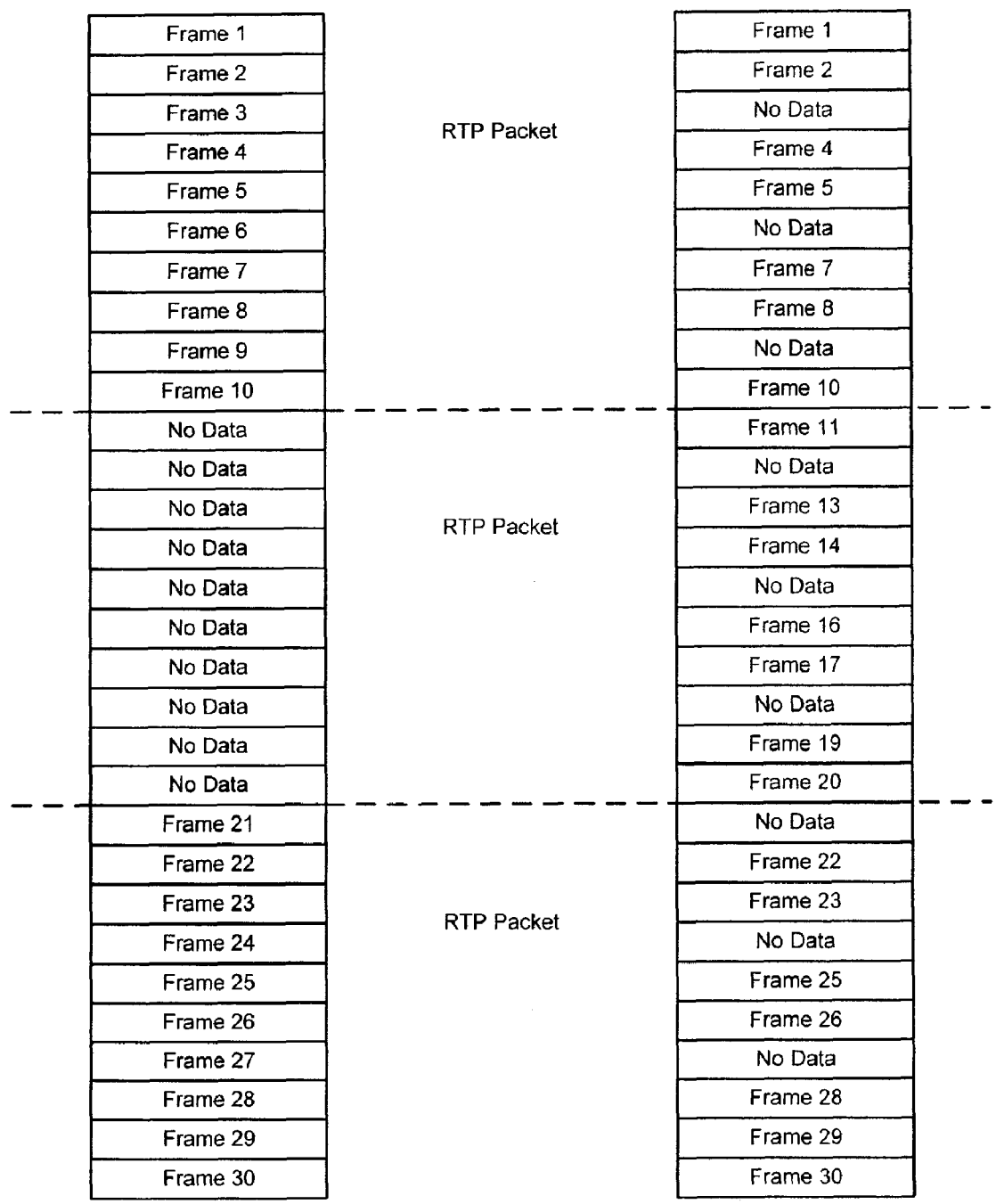
FIG. 6 compares the RTP packets of non-substituted AMR frames and substituted AMR frames at the destination.

FIG. 6 compares the RTP packets of non-substituted AMR frames and substituted AMR frames at the destination. The column on the left represents the received RTP packets of AMR frames without frame substitution performed at the source. In this example the source RTP packets are those shown in FIG. 4. The network, however, was congested and the IP stack was over buffered resulting in the loss of one of the RTP packets at the destination. This is shown as NO DATA frames where AMR frames 11-20 should have been. The loss of an entire RTP packet has a noticeable and substantial undesirable effect on the audio quality.

The right column of FIG. 6 represents the received RTP packets of AMR frames with frame substitution performed at the source. In this example the source RTP packets are those shown in FIG. 5. Since the network was congested the source substituted several AMR frames with NO DATA frames. The substitution was spread out over the RTP packets in a relatively even distribution. Thus, while virtually the same number of AMR frames were lost, an entire RTP packet was not. Each RTP packet suffers somewhat from the loss of a couple frames but the overall audio quality did not degrade precipitously or suddenly and a conversation can continue relatively normally.

It should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media could be a fixed storage media, but it could just as easily be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system or device.

Computer program instructions which implement all or a portion of the invention may also be embodied in a stream of information being retrieved over a network such as the Internet. Note that the computer usable or computer readable medium could even be paper or another suitable medium upon which computer program code is printed, as the code can be electronically captured via, for instance, an optical scan, then compiled and interpreted, or otherwise processed in a suitable manner.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A method of enhancing audio quality for Internet protocol (IP) based systems using an adaptive multi-rate (AMR) payload format comprising:
   obtaining an AMR frame;
   determining if a buffer of real-time transport protocol (RTP) packets has reached a threshold capacity as a result of congestive network conditions;
   placing the AMR frame into a RTP packet when the buffer has not yet reached the threshold capacity;
   in response to the buffer reaching or exceeding the threshold capacity:
      determining when to place a NO DATA frame into a current RTP packet based on current network congestion conditions; and
      placing a NO DATA frame into the current RTP packet, thus reducing a size of the RTP packet and a bandwidth required for uplink transmission of the current RTP packet;
   identifying AMR frames falling below a specified energy level; and
   substituting the AMR frames below the specified energy level with a NO DATA frame, the substituted NO DATA frames being spread out over the RTP packet to avoid clusters of NO DATA frames.

2. The method of claim 1 further comprising:
   determining if a AMR coding rate is set to its lowest possible setting before substituting the AMR frame with a NO DATA frame into the RTP packet, and if not re-setting the AMR coding rate to its lowest possible setting.

3. A system for enhancing audio quality for Internet protocol (IP) based systems using an adaptive multi-rate (AMR) payload format comprising:
   means for obtaining an AMR frame;
   means for determining if a buffer of real-time transport protocol (RTP) packets has reached a threshold capacity as a result of congestive network conditions;
   means for placing the AMR frame into a RTP packet when the buffer has not yet reached the threshold capacity;
   means for determining when to place a NO DATA frame into the RTP packet based on current network congestion conditions;
   means for placing a NO DATA frame into the RTP packet, thus reducing a size of the RTP packet and a bandwidth required for the RTP packet;
   means for identifying AMR frames falling below a specified energy level; and
   means for substituting the AMR frames below the specified energy level with a NO DATA frame, the substituted NO DATA frames being spread out over the RTP packet to avoid clusters of NO DATA frames.

4. The system of claim 3 further comprising:
   means for determining if an AMR coding rate is set to its lowest possible setting before substituting the AMR frame with a NO DATA frame into the RTP packet, and;
   means for re-setting the AMR coding rate to its lowest possible setting if the AMR coding rate is not set to its lowest possible setting before substituting the AMR frame with a NO DATA frame into the RTP packet.

5. An apparatus comprising a storage medium with instructions stored therein for enhancing audio quality for Internet protocol (IP) based systems using an adaptive multi-rate (AMR) payload format, the instructions when executed causing a processing device to perform:
   obtaining an AMR frame;
   determining if a buffer of real-time transport protocol (RTP) packets has reached a threshold capacity as a result of congestive network conditions;
   placing the AMR frame into a RTP packet when the buffer has not yet reached the threshold capacity;
   determining when to place a NO DATA frame into the RTP packet based on current network congestion conditions;
   placing a NO DATA frame into the RTP packet, thus reducing a size of the RTP packet and a bandwidth required for the RTP packet;
   identifying AMR frames falling below a specified energy level; and
   substituting the AMR frames below the specified energy level with a NO DATA frame, the substituted NO DATA frames being spread out over the RTP packet to avoid clusters of NO DATA frames.

6. The apparatus of claim 5 further performing:
   determining if a AMR coding rate is set to its lowest possible setting before substituting the AMR frame with a NO DATA frame into the RTP packet, and if not re-setting the AMR coding rate to its lowest possible setting.

7. A method of enhancing audio quality for Internet protocol (IP) based systems using an adaptive multi-rate (AMR) payload format, the method comprising:
   obtaining an AMR frame;
   determining if a buffer of real-time transport protocol (RTP) packets has reached a threshold capacity as a result of congestive network conditions;
   placing the AMR frame into a RTP packet when the buffer has not yet reached the threshold capacity; and
   in response to the buffer reaching the threshold capacity:
      determining when to place a NO DATA frame into the RTP packet based on current network congestion conditions; and
      placing a NO DATA frame into the RTP packet in response to determining when to place the NO DATA frame into the RTP packet based on current network congestion conditions, thereby reducing a size of the RTP packet and a bandwidth required for uplink transmission of the RTP packet,
   identifying AMR frames falling below a specified energy level; and
   substituting the AMR frames below the specified energy level with substitute NO DATA frames, the substitute NO DATA frames being spread out over the RTP packet to avoid clusters of NO DATA frames.

8. The method of claim 7, wherein the determining when to place a NO DATA frame into the RTP packet based on current network congestion conditions comprises determining whether to decimate the AMR frame.

9. The method of claim 7, wherein the placing a NO DATA frame into the RTP packet comprises substituting placing a NO DATA frame into the RTP packet instead of placing the AMR frame into the NO DATA frame.

10. The method of claim 8, further comprising sending the RTP packet.

* * * * *